(12) United States Patent
Gaigler et al.

(10) Patent No.: US 9,476,411 B2
(45) Date of Patent: Oct. 25, 2016

(54) COLD WATER PIPE ASSEMBLY FOR OCEAN THERMAL ENERGY CONVERSION

(71) Applicant: Lockheed Martin Corporation, Bethesda, MD (US)

(72) Inventors: Randy L. Gaigler, Parkville, MD (US); Matthew B. Ascari, Warrenton, VA (US); Corey A. Fleischer, Abingdon, MD (US); James A. Waicukauski, Bel Air, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/577,237

(22) Filed: Dec. 19, 2014

(65) Prior Publication Data

US 2016/0177928 A1 Jun. 23, 2016

(51) Int. Cl.
| | | |
|---|---|---|
| F16L 1/16 | (2006.01) | |
| F03G 7/05 | (2006.01) | |
| F16L 1/15 | (2006.01) | |
| F16L 1/10 | (2006.01) | |
| F16L 1/09 | (2006.01) | |
| E02B 17/02 | (2006.01) | |
| E02B 17/04 | (2006.01) | |
| E02B 17/08 | (2006.01) | |

(52) U.S. Cl.
CPC ............... *F03G 7/05* (2013.01); *E02B 17/021* (2013.01); *E02B 17/04* (2013.01); *E02B 17/08* (2013.01); *F16L 1/09* (2013.01); *F16L 1/10* (2013.01); *F16L 1/15* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,116,009 A | * | 9/1978 | Daubin | ..................... F03G 7/05 114/264 |
| 4,212,329 A | * | 7/1980 | Horton | ..................... F03G 7/05 138/155 |

(Continued)

FOREIGN PATENT DOCUMENTS

WO 2009152510 A2 12/2009

OTHER PUBLICATIONS

International Search Report and Written Opinion for International Patent Application No. PCT/US2015/066696, mailed Apr. 1, 2016, 13 pages.

*Primary Examiner* — Benjamin Fiorello
*Assistant Examiner* — Kyle Armstrong
(74) *Attorney, Agent, or Firm* — Withrow & Terranova, PLLC

(57) ABSTRACT

A cold water pipe assembly, and mechanisms for generating a cold water pipe assembly, are provided. A plurality of mooring lines are secured to a pipe end member. A pipe segment of a plurality of pipe segments is slidably coupled with respect to the mooring lines at a plurality of locations on a pipe wall of the pipe segment. The plurality of pipe segments is iteratively extended to form a pipe assembly of a desired length by joining a next pipe segment to a previous pipe segment to extend the pipe assembly, and lowering the pipe end member and the pipe assembly by extending the mooring lines. At least some of the next pipe segments are slidably coupled with respect to the mooring lines at a plurality of locations on a respective pipe wall of the at least some of the next pipe segments.

23 Claims, 8 Drawing Sheets

(56) References Cited

U.S. PATENT DOCUMENTS

| | | |
|---|---|---|
| 4,497,342 A | 2/1985 | Wenzel et al. |
| 2005/0109256 A1* | 5/2005 | Zaman ................ B63B 35/4413 114/230.23 |
| 2009/0264033 A1 | 10/2009 | Pollack et al. |
| 2009/0309271 A1 | 12/2009 | Miller et al. |
| 2010/0129160 A1 | 5/2010 | Bailey et al. |
| 2010/0275597 A1 | 11/2010 | Kuo |
| 2013/0011199 A1 | 1/2013 | Kibbee et al. |
| 2014/0356069 A1* | 12/2014 | Gateff ................ E02B 15/04 405/60 |

* cited by examiner

COLD WATER PIPE ASSEMBLY FOR OCEAN THERMAL ENERGY CONVERSION

TECHNICAL FIELD

The embodiments relate generally to cold water pipe generation in a deep water environment.

BACKGROUND

There is increasing interest in Ocean Thermal Energy Conversion (OTEC) as a renewable source of electrical energy. OTEC uses the ocean's natural thermal gradient to generate power. In geographical areas with warm surface water and cold deep water, the temperature difference can be leveraged to drive a steam cycle that turns a turbine and produces power. Warm surface sea water passes through a heat exchanger, vaporizing a low boiling point working fluid to drive a turbine generator, thereby producing electricity. Unfortunately, one challenge with OTEC is the need for a cold water pipe (CWP) that must be capable of drawing large volumes of water from deep in the ocean up to the surface.

The CWPs used in OTEC are often large diameter pipes that are 4 meters (m) or more in diameter and over 1000 m in length. CWPs are often built in situ by coupling smaller segments of pipe together to form a CWP of a desired length. A CWP must be able to withstand various environmental forces, including wave-induced motion (WIM) cyclic strain, WIM axial buckling, vortex-induced vibration (VIV) cyclic strain, platform rotation, clump weight axial forces, and the like. Also, due to the always present threat of unpredictable and extreme weather in deep water environments, the CWPs are engineered so that they can withstand forces induced by severe storms during fabrication, assembly, and deployment of the CWP. Typically, these induced forces on the CWP are less after the CWP is installed into the ocean. CWPs are often made of fiberglass and/or carbon-fiber composites to meet the various forces that they will, or might, encounter during installation and/or operation. Such CWPs are expensive, and they are time-consuming to build and install. For example, it can take 90 days or more to build and install such a CWP. Because extreme weather events have been shown to induce greater forces into the CWP structure during fabrication, these long deployment times increase the likelihood that a CWP will encounter and must withstand an extreme weather event.

SUMMARY

Among other features, the embodiments relate to a cold water pipe (CWP) assembly that includes pipe segments that comprise a polyethylene thermoplastic. The pipe segments are joined to one another, and are slidably coupled to a plurality of mooring lines at multiple locations on a pipe wall of the pipe segments. The embodiments facilitate the generation of a CWP in substantially less time, and at substantially lower costs and risks, than conventional CWPs.

In one embodiment, a method of generating a pipe assembly is provided. A plurality of mooring lines are secured to a pipe end member. A pipe segment of a plurality of pipe segments is slidably coupled with respect to the plurality of mooring lines at a plurality of locations on a pipe wall of the pipe segment. The plurality of pipe segments is iteratively extended to form a pipe assembly of a desired length by joining a next pipe segment to a previous pipe segment to extend the pipe assembly, and by lowering the pipe end member and the pipe assembly by extending the plurality of mooring lines. At least some of the pipe segments are slidably coupled with respect to the plurality of mooring lines at a plurality of locations on a respective pipe wall of the at least some of the pipe segments.

In one embodiment, the pipe end member comprises a pipe segment. In one embodiment, the pipe end member is coupled to an object, such as a clump weight, that is configured to exert a downward force on the pipe end member. In one embodiment, the pipe end member comprises a plurality of projections spaced radially about the pipe end member. Each mooring line of the plurality of mooring lines is secured to a corresponding projection.

In one embodiment, the next pipe segment is joined to the previous pipe segment by electrofusion. In another embodiment, the next pipe segment is joined to the previous pipe segment by butt fusion.

In one embodiment, each mooring line is controlled by a corresponding winch of a plurality of winches. The pipe end member and the pipe assembly are lowered by extending the plurality of mooring lines in synchronization with the corresponding plurality of winches.

In one embodiment, the pipe assembly comprises a polyethylene thermoplastic. In one embodiment, each mooring line comprises a rope comprising a high modulus polyethylene.

In another embodiment, a deep water structure is provided. The deep water structure includes a platform forming a primary opening. A pipe segment fusion mechanism is configured to fuse pipe segments with respect to one another. The pipe segments are configured to be slidably coupled to a plurality of mooring lines. A plurality of winches is coupled with respect to the platform and is configured to wind out a respective mooring line of the plurality of mooring lines. The deep water structure includes a pipe assembly comprising a plurality of fused pipe segments slidably coupled to the mooring lines and extending a distance below the platform.

In one embodiment, the winches are positioned substantially equidistant from one another about a perimeter of the primary opening.

In another embodiment, a pipe assembly is provided. The pipe assembly includes a pipe end member secured to a plurality of mooring lines, and a plurality of joined pipe segments. At least some of the pipe segments are slidably coupled with respect to the mooring lines at a plurality of locations on a respective pipe wall of the pipe segments.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first pipe segment" and "next pipe segment," and does not imply a priority, a type, an importance, or other attribute, unless otherwise stated herein. The term "about" used herein in conjunction with a numeric value means any value that is within a range of ten percent greater than or ten percent less than the numeric value.

Among other features, the embodiments relate to a cold water pipe (CWP) assembly that includes pipe segments that comprise a polyethylene thermoplastic. The pipe segments are joined to one another, and are slidably coupled to a plurality of mooring lines at multiple locations on a pipe wall of the pipe segments, such that the pipe segments can slide with respect to the mooring lines. The embodiments facilitate the generation of a CWP in substantially less time, and at substantially lower costs, than conventional CWPs.

Figure 1:
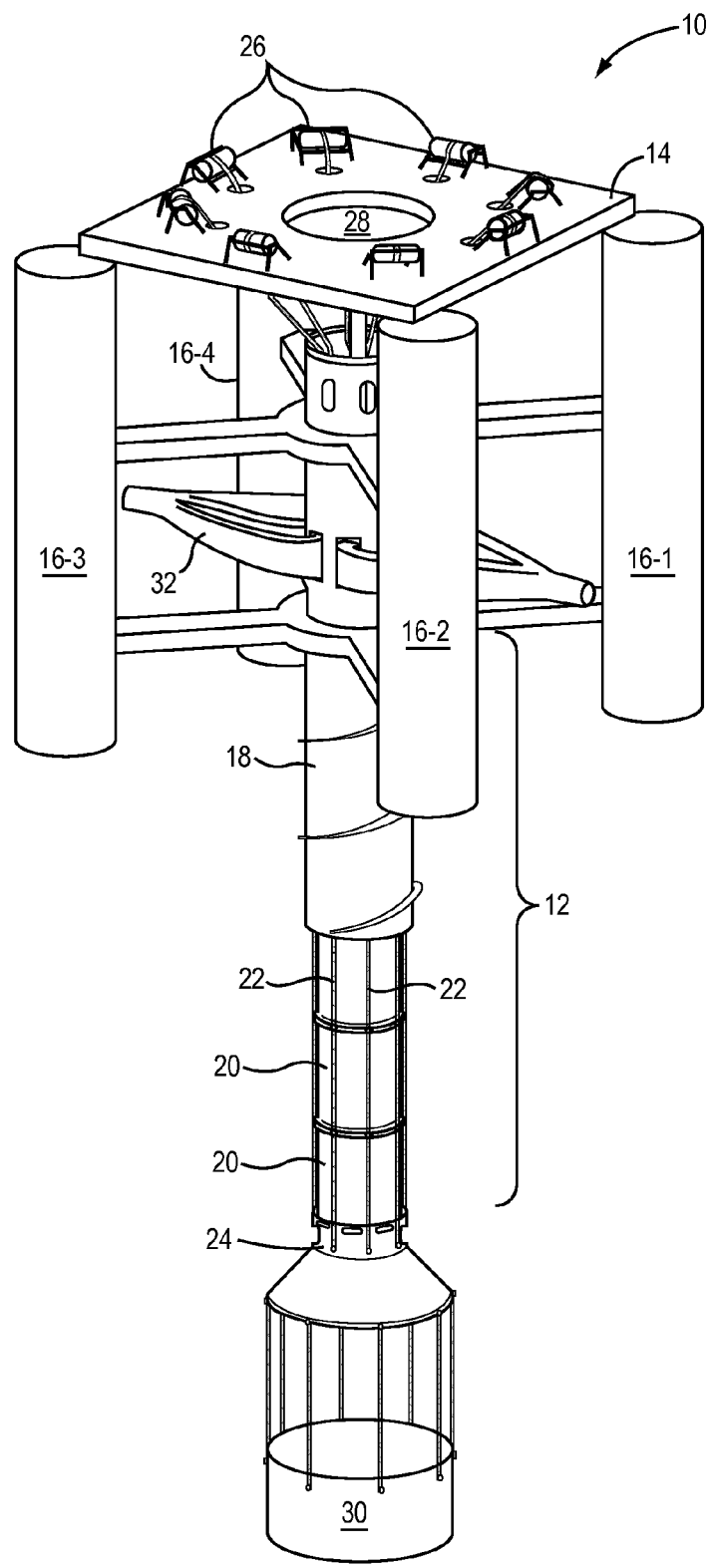
FIG. 1 is a perspective view of a deep water structure and assembled cold water pipe (CWP) assembly according to one embodiment.

FIG. 1 is a perspective view of a deep water structure 10 and assembled cold water pipe assembly 12 according to one embodiment. The deep water structure 10 comprises a platform 14 that is supported by a number, in this example four, flotation pillars 16-1-16-4.

The deep water structure 10 may include a spar structure 18 that encloses a top portion of the pipe assembly 12 both during generation and in operation to protect the top portion of the pipe assembly 12 from ocean forces that are relatively more substantial at the surface of the ocean than in the depths of the ocean. The spar structure 18 may extend a desired distance into the ocean. In some embodiments, the spar structure 18 extends to a depth of about 100 meters. The spar structure 18 may be designed to react and absorb loads from the pipe assembly 12. In one embodiment, this may be done using a resilient material, such as by positioning a gel bag between the spar structure 18 and the pipe assembly 12. In some embodiments, the spar structure 18 may comprise a composite material. In some embodiments, the spar structure 18 may be made of a material that matches a stiffness of the pipe assembly 12.

The pipe assembly 12 is formed from a plurality of pipe segments 20 made of a polyethylene thermoplastic, such as, by way of non-limiting example, high-density polyethylene (HDPE). Each pipe segment 20 may be made by helically winding a polyethylene (PE) 100 resin around a collapsible steel mandrel, for example. In some embodiments, the pipe segments 20 consist essentially of polyethylene thermoplastic and little to no other compounds, such as fiberglass. In other embodiments, the pipe segments 20 include fiberglass to increase stiffness. In one embodiment, the pipe segments 20 include about 20% fiberglass.

The pipe assembly 12 includes a plurality of mooring lines 22 that are coupled, at one end, to a pipe end member 24 of the pipe assembly 12 and, at another end, to respective winches 26 that are positioned with respect to the platform 14. In one embodiment, the winches 26 are positioned substantially equidistantly from one another about a primary opening 28 formed in the platform 14.

The mooring lines 22, in one embodiment, preferably comprise a high modulus polyethylene (HMPE) rope, such as, by way of non-limiting example, Dyneema® SK78, Dyneema® SK75, or Dyneema® DM20, available from Koninklijke DSM N.V., a company established at Het Overloon 1, 6411 TE Heerlen, the Netherlands. The embodiments utilize the mooring lines 22 to take on and eliminate from the pipe segments 20 the majority of the forces that would otherwise by borne by the pipe segments 20, allowing the pipe segments 20 to comprise a material, such as HDPE, that need not be capable of otherwise withstanding the various forces that are typically encountered by a CWP. In this manner, the pipe segments 20 need only be sufficient to withstand the suction forces generated while pumping water from the ocean depths through the pipe assembly 12. The use of pipe segments 20 made almost entirely of HDPE allows for a relatively rapid construction of the pipe assembly 12 using joining techniques such as electrofusion and/or butt fusion. The mooring lines 22 may be of a suitable diameter sufficient to provide the necessary strength. In one embodiment, the mooring lines 22 may be about 4 inches in diameter.

The pipe assembly 12 is coupled to an object, such as a clump weight 30, that creates tension on the pipe assembly 12 and decreases the bending moment at the top of the pipe assembly 12. The clump weight 30 may comprise any suitable weight sufficient to create a desired tension. In one embodiment, the clump weight 30 weighs about 500 tons. The pipe assembly 12 may have a length in excess of 1000 meters.

In operation, relatively cold water is taken in the pipe assembly 12 at the pipe end member 24 and pumped upward through the pipe assembly 12 toward the platform 14. A conduit or passage, such as a manifold 32, may be utilized to route the water from the pipe assembly 12 to one or more desired destinations as part of the OTEC process. To prevent obscuring certain features illustrated in FIG. 1, the manifold 32 is not illustrated with connections to such one or more desired destinations.

Figure 2:
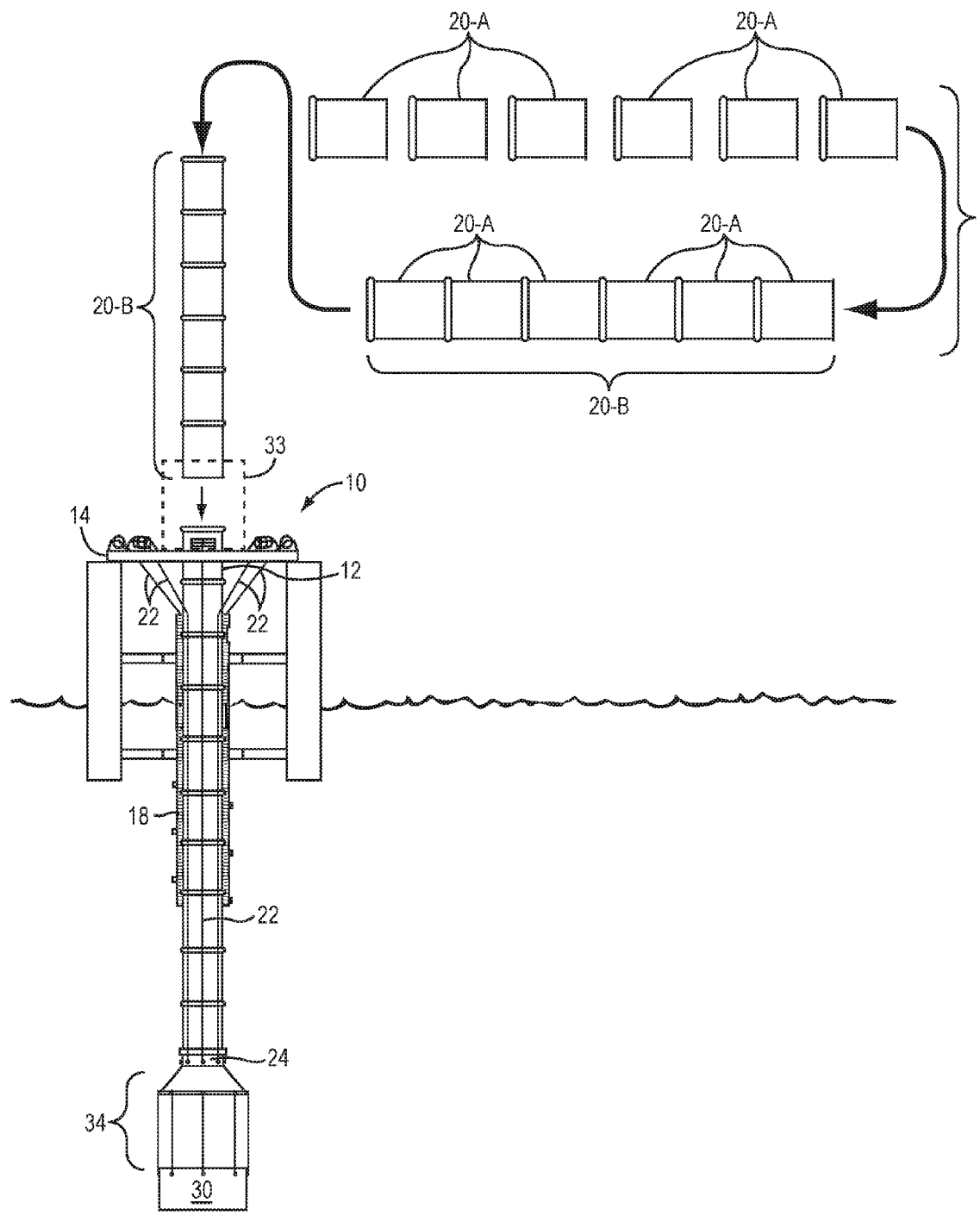
FIG. 2 is a diagram illustrating assembly of the pipe assembly according to one embodiment.

FIG. 2 is a diagram illustrating assembly of the pipe assembly 12 according to one embodiment. The spar structure 18 is illustrated in a cutaway view to show that portion of the pipe assembly 12 that is within the spar structure 18. In one embodiment, a plurality of pipe segments 20-A may be joined to one another to form a pipe segment 20-B. The plurality of pipe segments 20-A may be joined to one another by any desired manner. In one embodiment, the pipe segments 20-A are joined together utilizing an electrofusion process. In another embodiment, the pipe segments 20-A are joined together utilizing a butt fusion process. The pipe segment 20-B may be formed on a surface that is adjacent to the platform 14, such as on a ship (not illustrated), may be formed on the ground and floated to the platform 14, or may be formed on the platform 14. A requisite number of pipe segments 20-B may be formed in advance of the assembly of the pipe assembly 12, greatly reducing the number of junctions that must be formed during the assembly of the pipe assembly 12, and greatly reducing the time required to build the pipe assembly 12.

The pipe segment 20-B is lifted, such as by a crane (not illustrated), oriented with respect to the pipe assembly 12, and joined to the pipe assembly 12 to extend the pipe assembly 12 by the length of the pipe segment 20-B. As will be discussed in greater detail herein, the pipe segment 20-B is slidably coupled with respect to the mooring lines 22 at a plurality of locations on the pipe wall of the pipe segment 20-B, such that the pipe segment 20-B can slide with respect to the mooring lines 22. The winches 26 synchronously wind out the mooring lines 22 to lower the pipe end member 24 and the pipe assembly 12 deeper into the ocean and maintain tension on the mooring lines 22 to limit deflection due to ocean current. In some embodiments, heave compensation devices may be utilized in conjunction with the winches 26 to compensate for motion due to waves and ocean movement. The clump weight 30 provides sufficient weight to pull the pipe end member 24 and the pipe assembly 12 toward the ocean floor as the mooring lines 22 wind out. A next pipe segment 20-B may then be added to the top of the pipe assembly 12. This process may be iteratively repeated until the pipe assembly 12 is a desired length.

After assembly and deployment, the mooring lines 22 may be decoupled from the winches 26 and connected to connection points on the platform 14. It some embodiments, it may be desirable to maintain the winches 26 on the platform 14 for subsequent use in maintaining or replacing sections of the pipe assembly 12, if necessary.

In one example, each pipe segment 20-A has an internal diameter of about 4 meters and is approximately 18 feet long. Six pipe segments 20-A are joined together, on a platform or on the ground, to form a 108-foot-long pipe segment 20-B. This is repeated 31 times, to form 31 pipe segments 20-B. The 31 pipe segments 20-B are then floated, or otherwise transported, in proximity to the platform 14. A first pipe segment 20-B is lifted by a crane and oriented above the primary opening 28. The first pipe segment 20-B is coupled to the pipe end member 24 at a fusion station 33 on the platform 14. In one embodiment, each pipe segment 20 includes an annular thickened wall portion where the pipe segment 20 joins with another pipe segment 20 to provide additional ring stiffness to the pipe assembly 12, to resist buckling collapse.

The fusion station facilitates alignment of the pipe segment 20-B with the pipe assembly 12 and provides sufficient force for the respective fusion process, as well as a power source.

The pipe end member 24, in some embodiments, may be a pipe segment 20-A with a plurality of projections spaced radially about the exterior surface of the pipe end member 24 for coupling to the mooring lines 22. In other embodiments, the pipe end member 24 may be made of a structurally rigid material, such as stainless steel or aluminum.

In this example, the pipe end member 24 and the pipe segment 20-B are lowered through the spar structure 18 by winding out the mooring lines 22. As the pipe end member 24 and the pipe segment 20-B are lowered, the pipe end member 24 and the pipe segment 20-B may be halted from time to time to allow the mooring lines 22 to be slidably coupled to the pipe segment 20-B. After the pipe end member 24 and the pipe segment 20-B extend through the spar structure 18, the clump weight 30 may be coupled via a bell assembly 34 to the pipe end member 24 to provide the desired tension to the pipe assembly 12.

In this example, the crane time necessary to lift a pipe segment 20-B to the platform 14 is one hour, the fusion preparation time to join two pipe segments 20-B together is one hour, the time to fuse the two pipe segments 20-B together is 30 minutes, and it takes one hour to lower the pipe segment 20-B and couple the pipe segment 20-B to the mooring lines 22. This results in 3.5 hours to fully extend the pipe assembly 12 for each pipe segment 20-B. Assuming a desired depth of 1000 meters, and the use of 31 pipe segments 20-B, it takes approximately 108.5 hours (approximately 4.5 days) to completely assemble the pipe assembly 12. This is contrasted with current CWP assembly techniques that can take 90 days to assemble a 1000 meter CWP.

Figure 3:
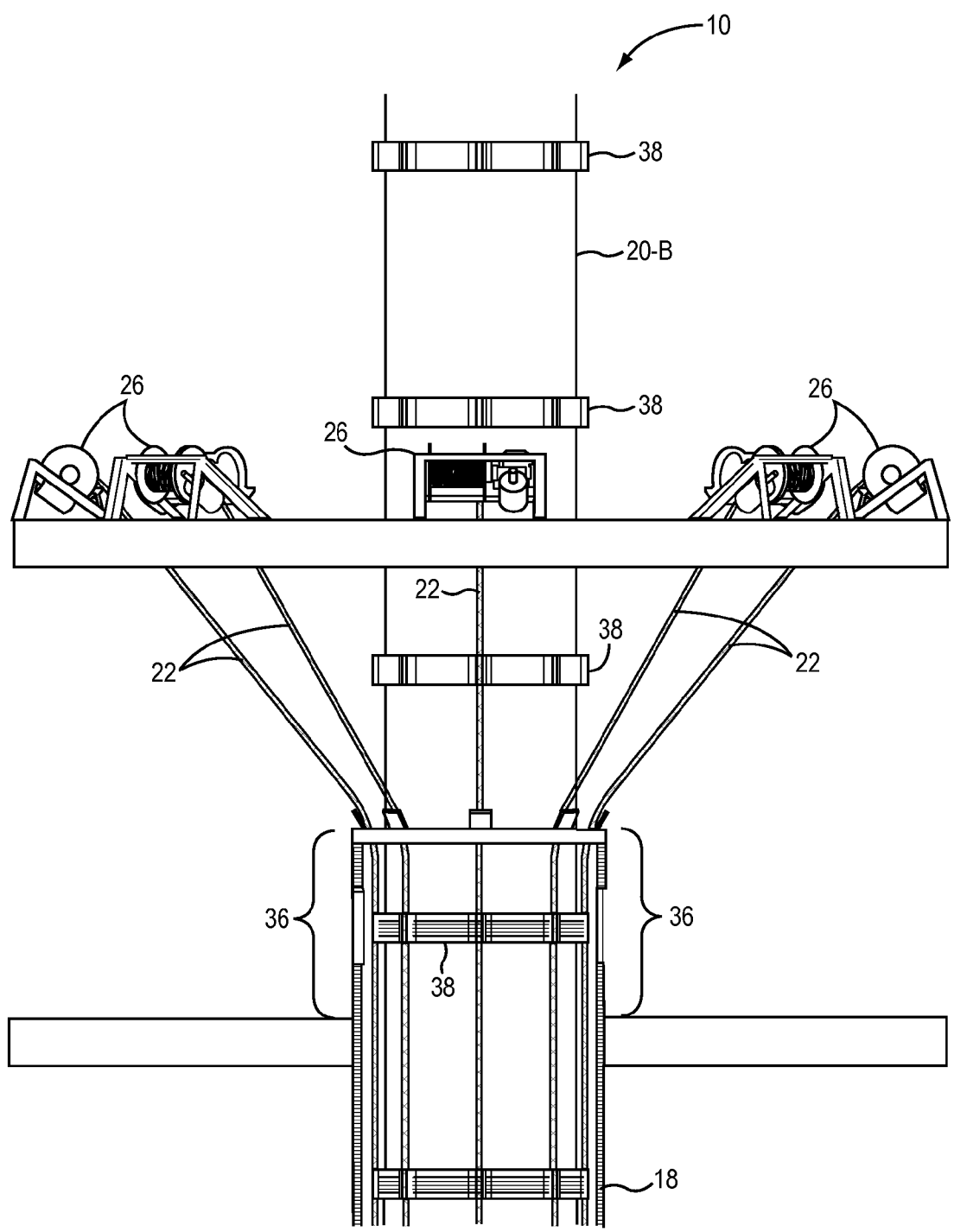
FIG. 3 is a diagram illustrating a mooring securing station of the deep water structure.

FIG. 3 is diagram illustrating a mooring securing station 36 of the deep water structure 10. Again, the spar structure 18 is illustrated in a cutaway view to show that portion of the pipe assembly 12 that is within the spar structure 18. As the pipe segment 20-B is lowered through the spar structure 18, the winches 26 periodically halt the winding out of the mooring lines 22 such that particular regions 38 of the pipe wall of the pipe segment 20-B are accessible at the mooring securing station 36. The pipe segment 20-B is thereby slidably coupled with respect to the mooring lines 22, and the pipe segment 20-B may be further lowered until a next region 38 is presented at the mooring securing station 36, where the process is repeated.

Figure 4:
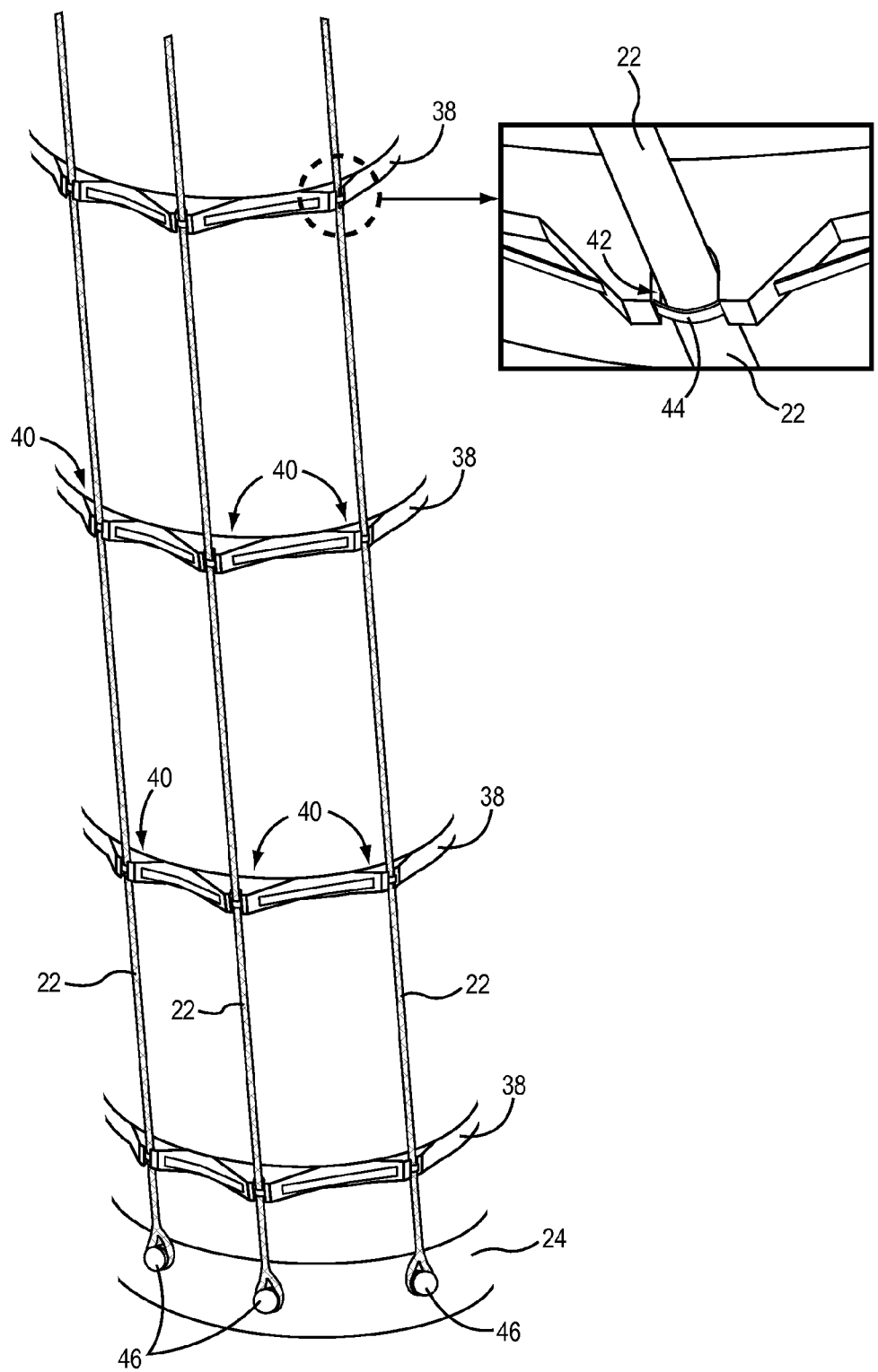
FIG. 4 is a diagram illustrating a pipe segment and a pipe end member according to one embodiment.

FIG. 4 is a diagram illustrating a portion of a pipe segment 20-B and the pipe end member 24 according to one embodiment. The pipe segment 20-B is slidably coupled to the mooring lines 22 at a plurality of locations 40. In this embodiment, the regions 38 include a plurality of notches 42 spaced relatively equidistantly about the pipe segment 20-B, and which receive respective mooring lines 22. A band 44 maintains the mooring lines 22 within the respective notches 42, and thus slidably secures the pipe segment 20-B with respect to the mooring lines 22. The band 44 may comprise a material with sufficient strength to maintain the mooring lines 22 within the respective notches 42, but that does not fray or otherwise degrade the mooring lines 22 during operation of the pipe assembly 12. While the band 44 is one mechanism for slidably securing the pipe segment 20-B with respect to the mooring lines 22, the embodiments are not limited to the use of a band, and other mechanisms may be utilized, such as, by way of non-limiting example, carabiners, or the like.

The pipe end member 24 comprises a plurality of radially spaced projections 46 to which the mooring lines 22 may be secured. The projections 46 are merely one example mechanism of attaching the mooring lines 22 with respect to the pipe end member 24, and the embodiments are not limited to any particular connection mechanism. In some embodiments, end segments of the mooring lines 22 may be made of a material that differs from the majority of the mooring lines 22, such as metal cable or chain, that is sufficiently resistant to abrasion, water temperature, or other factors relevant to the end portions of the pipe assembly 12. Thus, the mooring lines 22 may predominantly comprise HMPE rope that is spliced at end portions to steel cable.

Figure 5:
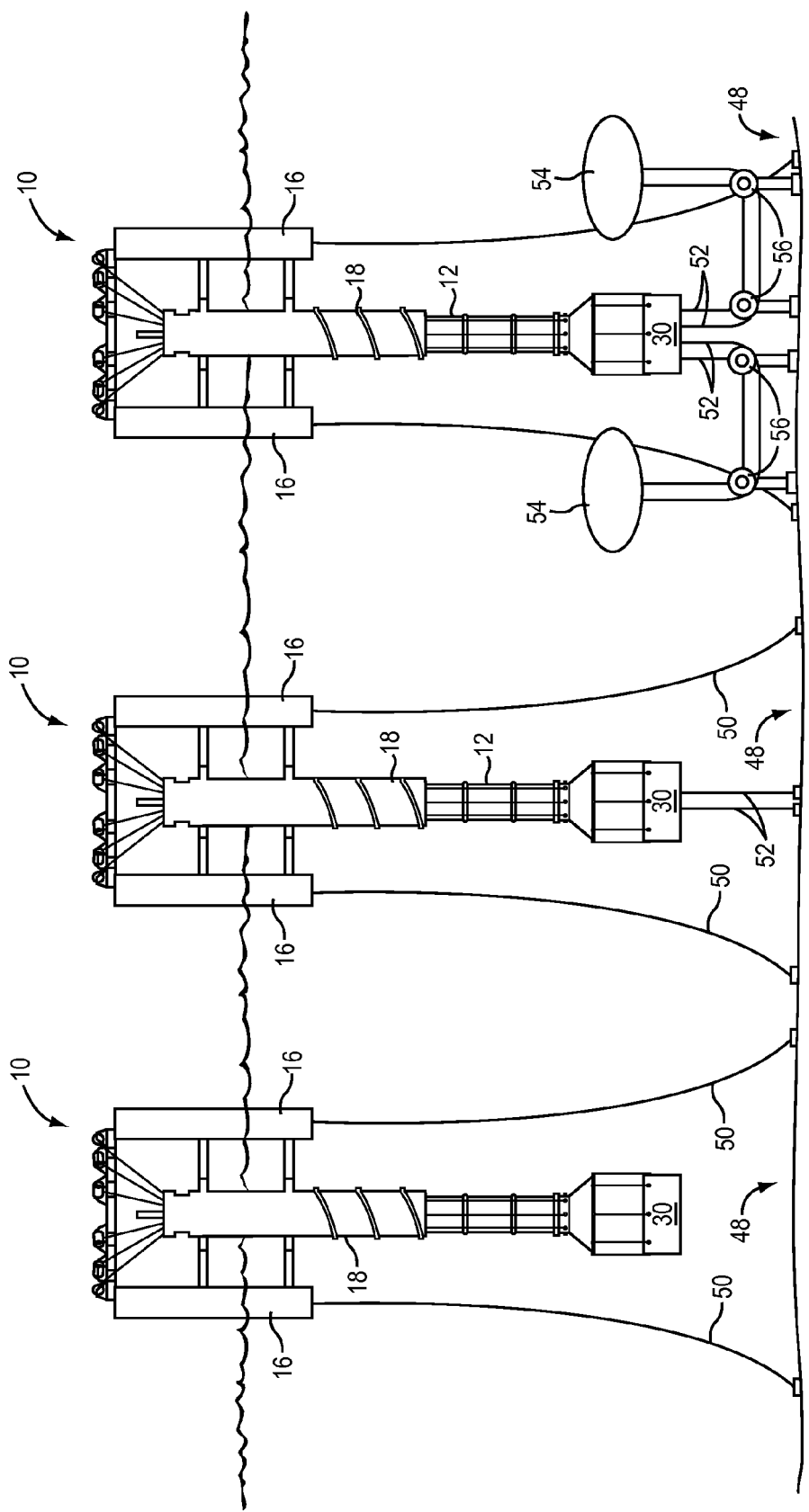
FIGS. 5A-5C are diagrams illustrating different mooring mechanisms by which the deep water structure may be moored with respect to an ocean floor.

FIGS. 5A-5C are diagrams illustrating different mooring mechanisms by which the deep water structure 10 may be moored to an ocean floor 48. FIG. 5A illustrates a plurality of mooring lines 50 coupled between the flotation pillars 16 and the ocean floor 48 to limit lateral movement of the deep water structure 10. FIG. 5B illustrates a plurality of mooring lines 50 coupled between the flotation pillars 16 and the ocean floor 48, as well as mooring lines 52 coupled between the ocean floor 48 and the clump weight 30, to even further reduce lateral movement of the pipe assembly 12. FIG. 5C illustrates an embodiment wherein the mooring lines 52 are coupled to ballast tanks 54. Ballast tanks 54 are flotation devices that are anchored with respect to the ocean floor 48 via guides 56, and thereby are configured to exert a tension, that may be varied by altering the flotation of the ballast tanks 54, to the pipe assembly 12.

Figure 6:
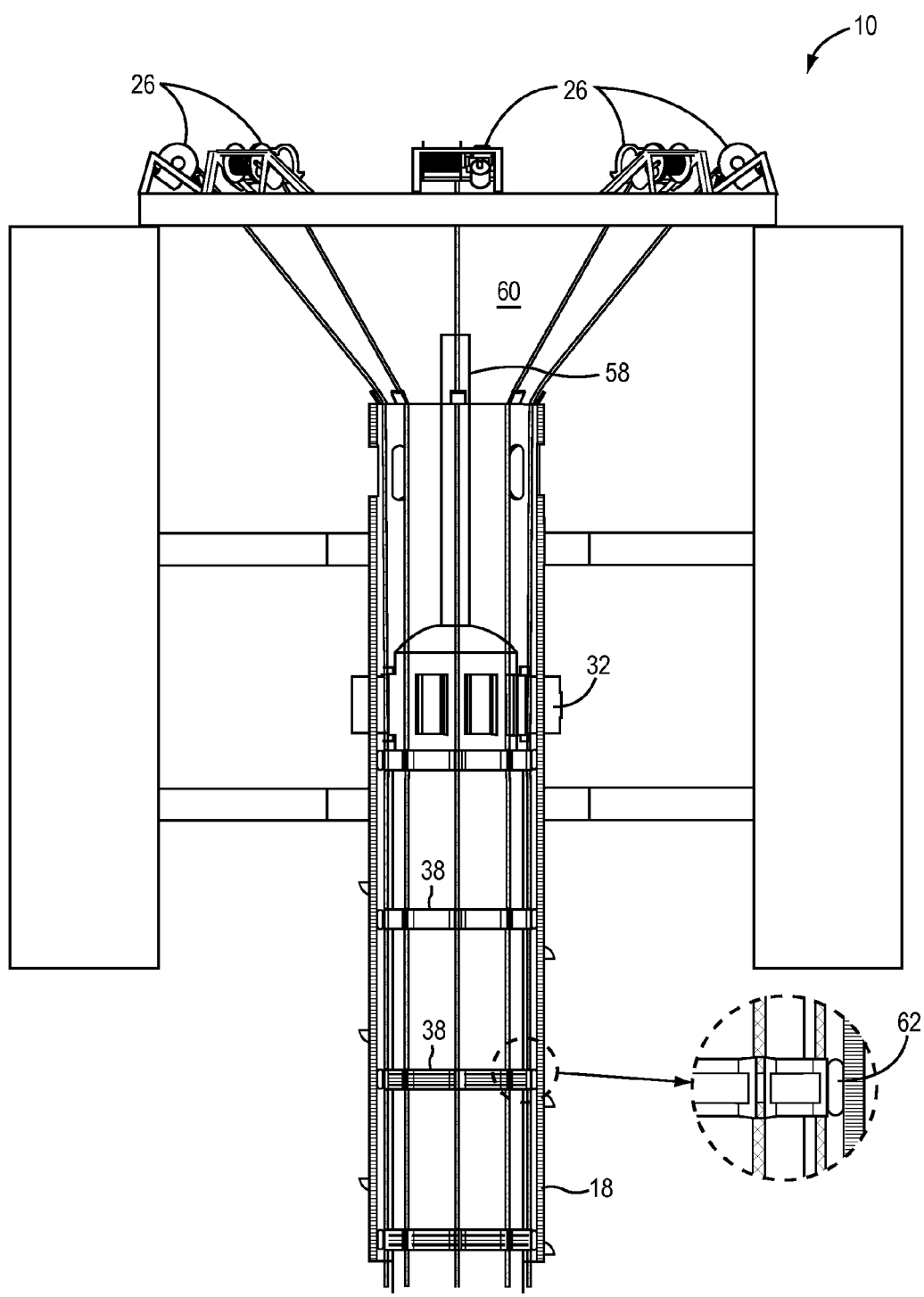
FIG. 6 is a diagram illustrating a water hammer damper structure 58 according to one embodiment.

FIG. 6 is a diagram illustrating a water hammer damper structure 58 according to one embodiment. The spar structure 18 is again illustrated in a cutaway view to show that portion of the pipe assembly 12 that is within the spar structure 18, and to show aspects of the water hammer damper structure 58. The water hammer damper structure 58 vents to the atmosphere 60 and allows compressed gas to vent from the pipe assembly 12. In one embodiment, a damper/resilient material 62 may be fixed between the regions 38 and the interior surface of the spar structure 18 to transition loads from the pipe assembly 12 to the spar structure 18.

Figure 7:
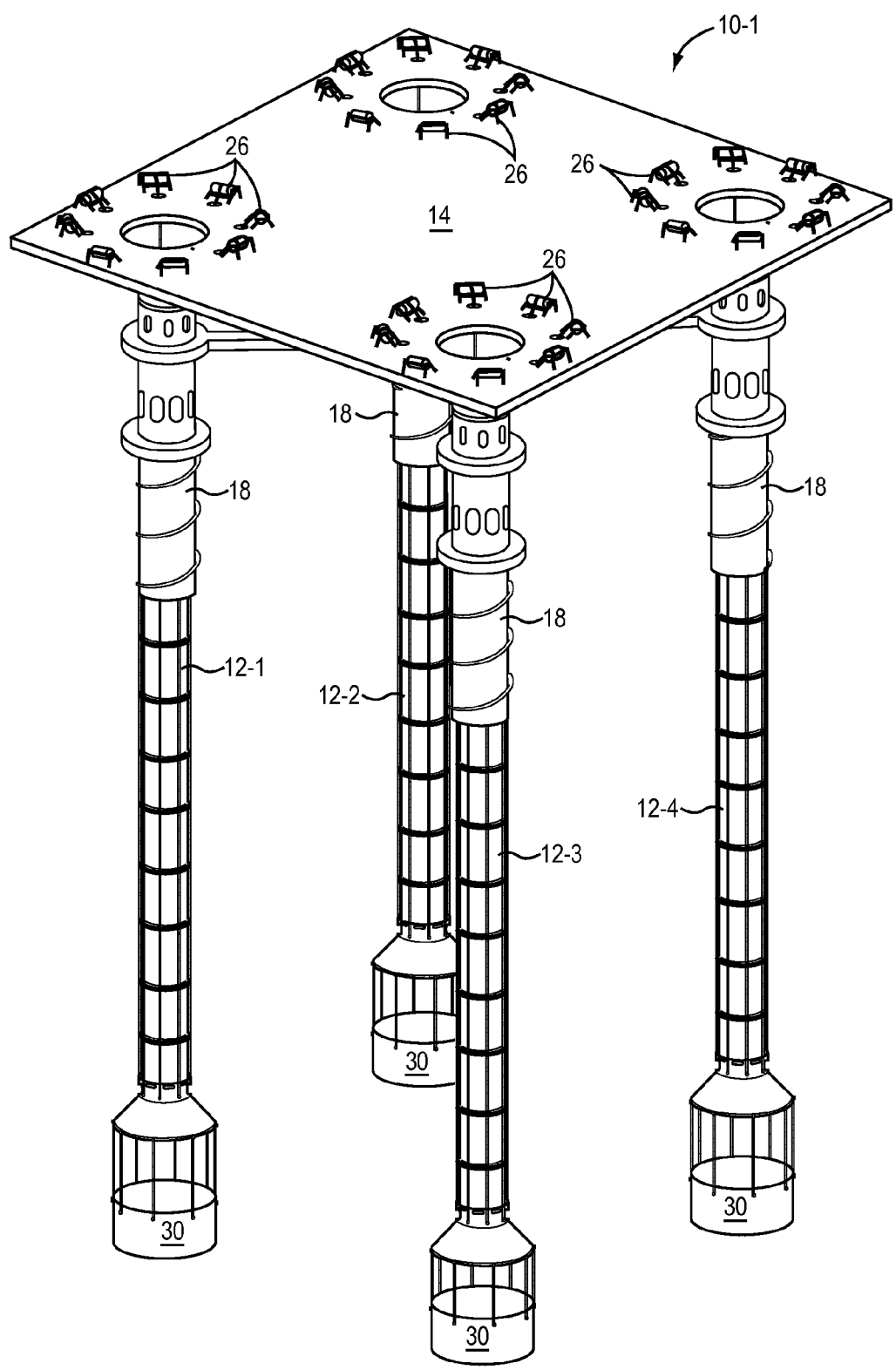
FIG. 7 is a perspective view of a deep water structure according to another embodiment.

FIG. 7 is a perspective view of a deep water structure 10-1 according to another embodiment. For purposes of illustration, manifolds 32 are not shown in FIG. 7. In this embodiment, greater amounts of electricity are produced, such as 100 megawatts, and thus greater amounts of cold water are necessary for operation. In lieu of a single CWP that has a very large diameter, such as a 10 meter diameter, four pipe assemblies 12-1-12-4 are generated and installed via the platform 14. Each pipe assembly 12 may comprise pipe segments 20-B that are approximately 5 meters in diameter, in lieu of a single 10 meter in diameter pipe which may substantially complicate generation, assembly and maintenance, due to the magnitude and logistics associated with a 10 meter diameter pipe.

Figure 8:
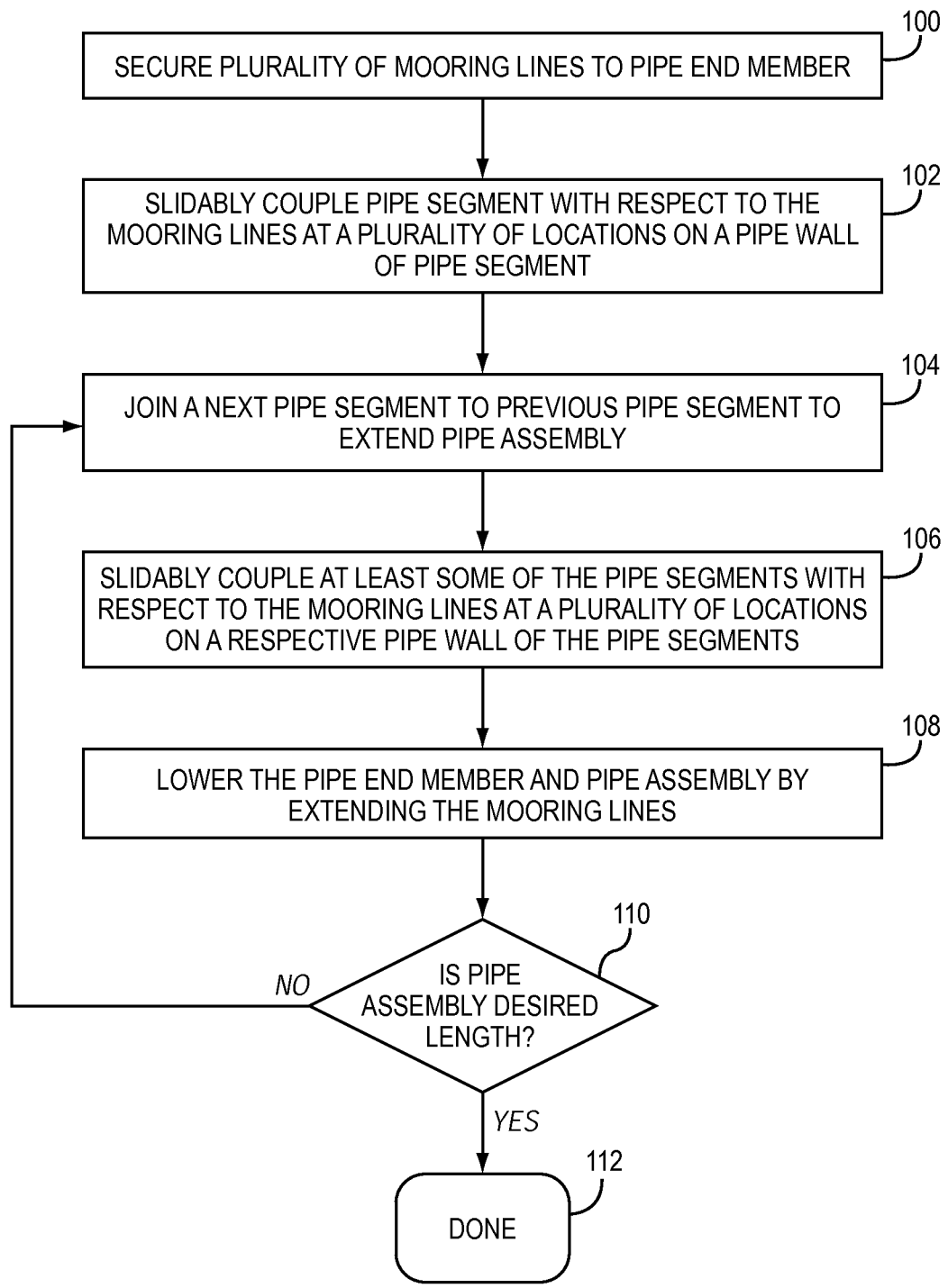
FIG. 8 is a flowchart of a method for generating the pipe assembly according to one embodiment.

FIG. 8 is a flowchart of a method for generating the pipe assembly 12 according to one embodiment. FIG. 8 will be discussed in conjunction with FIGS. 1 and 2. Initially, assume that a plurality of pipe segments 20-B has been formed from pipe segments 20-A on ground, or elsewhere, and are in proximity to the platform 14. The mooring lines 22 are secured to the pipe end member 24 (block 100). A first pipe segment 20-B is lifted and oriented above the primary opening 28. The first pipe segment 20-B is coupled to the pipe end member 24, and is slidably coupled with respect to the mooring lines 22 at a plurality of locations on a pipe wall of the pipe segment 20-B (block 102). A next pipe segment 20-B is joined to the previous pipe segment 20-B to extend the pipe assembly 12 (block 104). As the pipe segments 20-B are iteratively joined together, at least some of the pipe segments 20-B are slidably coupled with respect to the mooring lines at a plurality of locations on a respective pipe wall of the at least some of the pipe segments (block 106). In some embodiments, each pipe segment 20-B is slidably coupled with respect to the mooring lines 22 at a plurality of locations on the respective pipe wall. The pipe end member 24 and the pipe assembly 12 are lowered by extending the mooring lines 22 (block 108). If the pipe assembly 12 is the desired length, then generation of the pipe assembly 12 is complete (blocks 110, 112). Otherwise, the process repeats with another pipe segment 20-B (blocks 110, 104).

While solely for purposes of illustration the embodiments have been discussed in the context of a spar-type off-shore platform, the embodiments are not limited to any particular offshore-platform type, and have applicability with any suitable offshore platform, including, by way of non-limiting example, semi-submerged offshore platforms and tension leg offshore platforms.

Those skilled in the art will recognize improvements and modifications to the preferred embodiments of the disclosure. All such improvements and modifications are considered within the scope of the concepts disclosed herein and the claims that follow.

What is claimed is:

1. A method of generating a pipe assembly, comprising:
securing a plurality of mooring lines to a pipe end member;
slidably coupling a pipe segment of a plurality of pipe segments to the plurality of mooring lines at a plurality of locations on an exterior pipe wall of the pipe segment;
iteratively extending the plurality of pipe segments to form a pipe assembly of a desired length by:
fusing a next pipe segment to a previous pipe segment to extend the pipe assembly; and
lowering the pipe end member and the pipe assembly by extending the plurality of mooring lines; and
slidably coupling at least some of the pipe segments to the plurality of mooring lines at a plurality of locations on a respective exterior pipe wall of the at least some of the pipe segments by positioning the plurality of mooring lines in respective notches about the exterior pipe wall, and positioning a band about the pipe segment to maintain the plurality of mooring lines within the notches.

2. The method of claim 1, wherein the pipe end member comprises a pipe segment.

3. The method of claim 1, further comprising coupling the pipe end member to an object configured to exert a downward force on the pipe end member.

4. The method of claim 1, wherein the pipe end member comprises a plurality of projections spaced radially about the pipe end member, and wherein each mooring line of the plurality of mooring lines is secured to a corresponding projection.

5. The method of claim 1, wherein fusing the next pipe segment to the previous pipe segment comprises fusing the next pipe segment to the previous pipe segment by electrofusion.

6. The method of claim 1, wherein fusing the next pipe segment to the previous pipe segment comprises fusing the next pipe segment to the previous pipe segment by butt fusion.

7. The method of claim 1, wherein each mooring line is controlled by a corresponding winch of a plurality of winches, and wherein lowering the pipe end member and the pipe assembly by extending the plurality of mooring lines comprises lowering the pipe end member and the pipe assembly by extending, in synchronization, the plurality of mooring lines by the corresponding plurality of winches.

8. The method of claim 7, wherein lowering the pipe end member and the pipe assembly by extending, in synchronization, the mooring lines by the corresponding plurality of winches comprises lowering the pipe end member and the pipe assembly through an opening formed in a platform by extending, in synchronization, the plurality of mooring lines by the corresponding plurality of winches.

9. The method of claim 1, wherein the pipe assembly comprises a polyethylene thermoplastic.

10. The method of claim 1, wherein the pipe assembly consists essentially of a polyethylene thermoplastic.

11. The method of claim 1, wherein each mooring line comprises a rope comprising a high modulus polyethylene.

12. The method of claim 1, wherein the pipe assembly has a diameter greater than about 9 feet.

13. The method of claim 1, further comprising slidably coupling each pipe segment to the plurality of mooring lines at a plurality of locations on an exterior pipe wall of each respective pipe segment.

14. The method of claim 1, wherein lowering the pipe end member and the pipe assembly by extending the plurality of mooring lines further comprises lowering the pipe assembly through a spar structure.

15. A deep water structure, comprising:
a platform forming a primary opening;
a fusion station configured to fuse pipe segments with respect to one another, the pipe segments being configured to be slidably coupled to a plurality of mooring lines on exterior pipe walls of the pipe segments;
a plurality of winches coupled with respect to the platform and configured to wind out a respective mooring line of the plurality of mooring lines; and
a pipe assembly comprising a plurality of fused pipe segments slidably coupled to the mooring lines and extending a distance below the platform, at least some of the fused pipe segments comprising a plurality of notches positioned about the exterior pipe wall of the respective fused pipe segment, each mooring line of the plurality of mooring lines being positioned in one of the plurality of notches, and a band positioned about the respective fused pipe segment to slidably maintain the plurality of mooring lines within the notches.

16. The deep water structure of claim 15, wherein the winches are positioned substantially equidistant from one another about a perimeter of the primary opening.

17. The deep water structure of claim 15, wherein the pipe segments comprise a polyethylene thermoplastic.

18. The deep water structure of claim 15, wherein the pipe segments consist essentially of a polyethylene thermoplastic.

19. The deep water structure of claim 15, wherein the respective mooring line comprises a rope comprising a high modulus polyethylene.

20. The deep water structure of claim 15, wherein the pipe segments have a diameter greater than about 9 feet.

21. A pipe assembly, comprising:
a pipe end member secured to a plurality of mooring lines; and
a plurality of fused pipe segments, at least some of the pipe segments being slidably coupled to the mooring lines at a plurality of locations on a respective exterior pipe wall of the pipe segments, at least some of the fused pipe segments comprising a plurality of notches positioned about the exterior pipe wall of the respective fused pipe segment, each mooring line of the plurality of mooring lines being positioned in one of the plurality of notches, and a band positioned about the respective fused pipe segment to slidably maintain the plurality of mooring lines within the notches.

22. The pipe assembly of claim 21, wherein the pipe segments consist essentially of a polyethylene thermoplastic.

23. The pipe assembly of claim 21, wherein each mooring line comprises a rope comprising a high modulus polyethylene.

* * * * *